F. W. OFELDT.
VIBRATION DAMPING DEVICE.
APPLICATION FILED MAY 29, 1919.
1,377,849. Patented May 10, 1921.
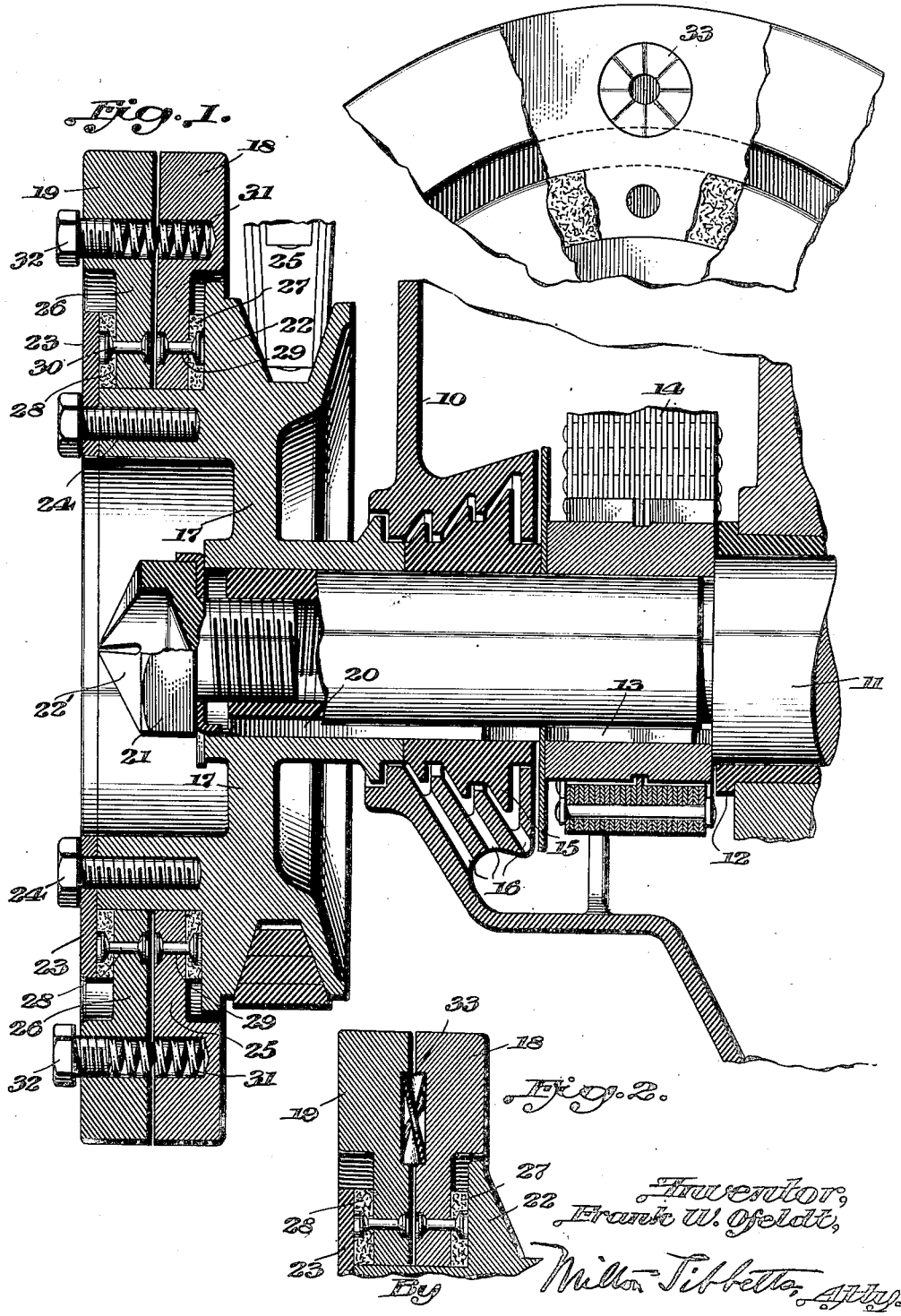

UNITED STATES PATENT OFFICE.

FRANK W. OFELDT, OF DETROIT, MICHIGAN, ASSIGNOR TO PACKARD MOTOR CAR COMPANY, OF DETROIT, MICHIGAN, A CORPORATION OF MICHIGAN.

VIBRATION-DAMPING DEVICE.

1,377,849.　　　　Specification of Letters Patent.　　Patented May 10, 1921.

Application filed May 29, 1919. Serial No. 300,708.

*To all whom it may concern:*

Be it known that I, FRANK W. OFELDT, a citizen of the United States, and resident of Detroit, Wayne county, State of Michigan, have invented certain new and useful Improvements in Vibration-Damping Devices, of which the following is a specification.

This invention relates to vibration damping devices, and more particularly to dampers of this type for use on hydrocarbon motors.

One of the objects of the invention is to provide a damping device which has few and simple parts, and is, therefore, adapted to economical manufacture.

Another object of the invention is to provide a vibration damping device in which there are no key connections between the opposed friction plates whereby the liability of noise caused by rattling is eliminated.

Other objects of the invention will appear from the following description taken in connection with the drawings which form a part of this specification, and in which—

Figure 1 is a vertical longitudinal section through one end of the crank shaft and the damper, Fig. 2 a detailed vertical section of a modified form of flexible connection, and Fig. 3 a detailed side view partly broken away of the means of connection shown in Fig. 2.

Referring to the drawings, 10 indicates the forward part of the crank case of a motor and 11 indicates the crank shaft mounted in bearings 12 therein. A sprocket or gear wheel 13 keyed to the shaft drives a chain 14 which operates the cam shaft or other parts of the motor. A throw-off ring 15 is also secured to the crank shaft and oil grooves 16 are adapted to carry the oil thrown off by the ring 15 back into the crank case to prevent its escape from the latter.

Mounted upon the end of the crank shaft which projects from the crank case is a vibration damper which embodies the present invention. This damper consists of an inner member 17 and two outer flywheel members 18 and 19. The member 17 is keyed to the crank shaft as by key 20 and a nut 21 is threaded on this crank shaft to hold the member 17 in place. The nut 21 is preferably provided with teeth or jaws 22' adapted for engagement with the starting crank of the motor. The member 17 is provided with a radial integral plate portion or flange 22 and with an opposed plate 23 which is detachably secured to the body of the member 17 by means of bolts 24. These plates are spaced apart axially and between them are adapted to extend the radial friction carrier parts 25 and 26 respectively of the two parts 18 and 19 of the flywheel.

Rings 27, 28, of frictional material, are arranged between the outer members 18, 19, and the opposed faces of the plates 22, 23 of the inner member 17. As shown, these rings are secured by rivets 29, 30, to the outer members and have frictional contact against the plate portions 22 and 23 of the inner member, being yieldingly pressed against such parts by means of coil springs 31, mounted at intervals in the outer parts of the members 18 and 19 and serving to press the latter apart axially. One end of each spring 31 bears against a wall of the member 18 and the other end bears against the end of a bolt 32 in the member 19, which bolt may be adjusted in order to adjust the pressure of the spring.

In operation the device is adapted to damp out the torsional vibrations of the shaft, which may occur at certain periods dependent upon the number of cylinders of the motor and other elements. The flywheel composed of the members 17, 18 will yield frictionally relatively to the shaft so that as the shaft vibrates torsionally the flywheel will oppose the vibrations and dampen them. In such an arrangement by dividing the flywheel into two members and connecting them solely by means of the coil springs any danger of rattle caused by a key connection or other connections of a rigid nature between these parts is eliminated.

In Figs. 2 and 3 the spring means for connecting the two parts 18 and 19 of the outer or flywheel member of the damper consist of a corrugated spring plate 33 or a series of such plates arranged at intervals around the adjacent faces of the parts 18 and 19 and adapted to both connect said parts and to exert an opposing pressure between the same such as will tend to keep the frictional facings 27 and 28 in contact with the opposing plates 22 and 23 of the inner member.

Having thus described my invention, what I claim and desire to secure by Letters Patent is:

1. A vibration damper having an inner member, an outer member composed of two axially separated parts, said inner and outer members being frictionally connected, and spring means for connecting the two parts of said outer member.

2. A vibration damper comprising an inner member, an outer flywheel, means of frictional connection between said inner member and fly wheel, said flywheel having two members axially separated and axial springs connecting said members and forcing them into axial frictional engagement with said inner member.

3. In combination with a shaft, vibration damping means for said shaft, comprising an inner member fixed to the shaft, an outer member rotatable relatively to the inner member, means of frictional engagement between the outer and inner members, said outer member being divided radially into two parts having separate, opposing frictional faces effecting said engagement with the inner member, and a series of axially extending coiled springs connecting said two parts of the outer member and effecting opposite pressure thereon to maintain said frictional engagement with the inner member.

4. In combination with a shaft, a vibration damper therefor comprising an inner member fixed to the shaft and having two annular radially extending plate portions spaced apart axially, a flywheel divided radially and having annular parts projecting into the spaces between the plates of said inner member, frictional members interposed between said flywheel and inner member, and spring means for connecting the members of said flywheel and for forcing the same apart to maintain the frictional engagement with the inner member.

5. A vibration damper comprising an inner member having opposed friction faces, a two-part outer member arranged between said opposed faces, friction rings arranged between the friction faces of said inner member and said outer member, and spring separating means for the two parts of the outer member.

6. A vibration damper comprising an inner member, a two-part flywheel member in frictional engagement with the inner member, and springs for separating the two parts of the flywheel member and for causing them to retain the same relative positions circumferentially on the inner member.

7. A vibration damper comprising an inner member, a two-part flywheel member in frictional engagement therewith, coiled springs arranged in recesses in the flywheel member, and bolts for said springs to adjust the tension thereof.

8. A vibration damper comprising an inner member having separable opposed friction faces, an outer member made in two parts arranged between said friction faces and adapted to be separated to contact therewith, and spring means mounted in said outer member for separating the two parts thereof.

In testimony whereof I affix my signature.

FRANK W. OFELDT.